Figure 4:
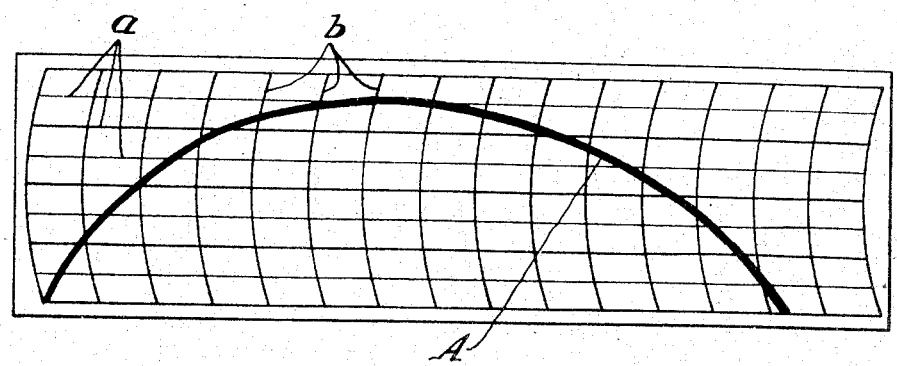

Dec. 23, 1941.  P. HALTON  2,267,561
METHOD OF ESTIMATING THE BAKING QUALITIES OF DOUGHS
Filed Jan. 31, 1938  3 Sheets-Sheet 1
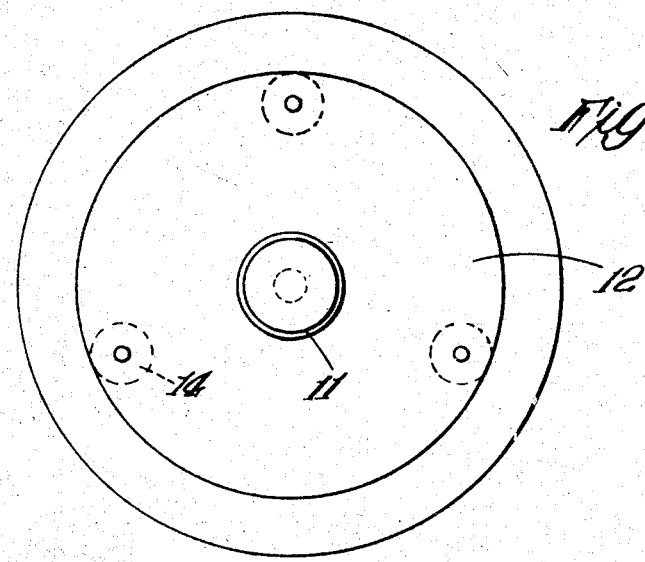
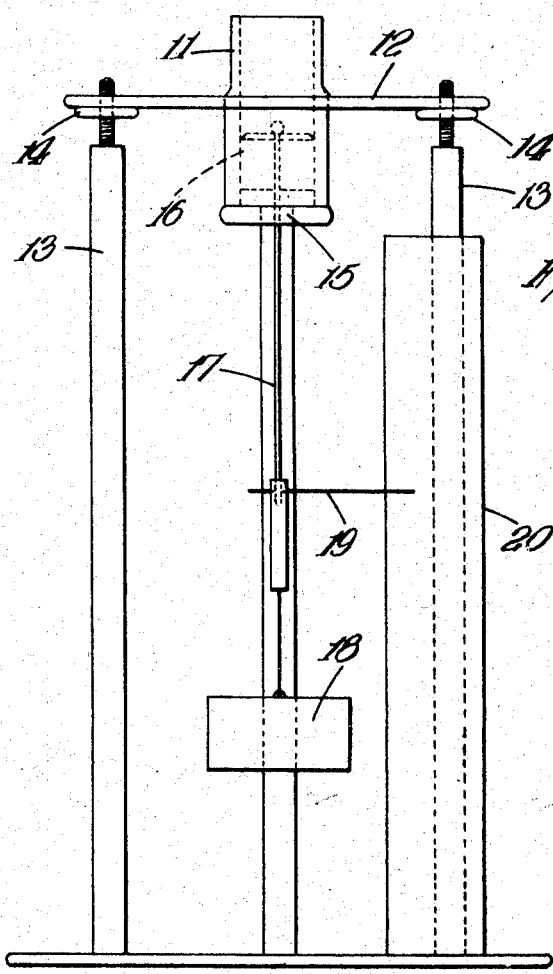
INVENTOR
PHILIP HALTON
BY
ATTORNEYS

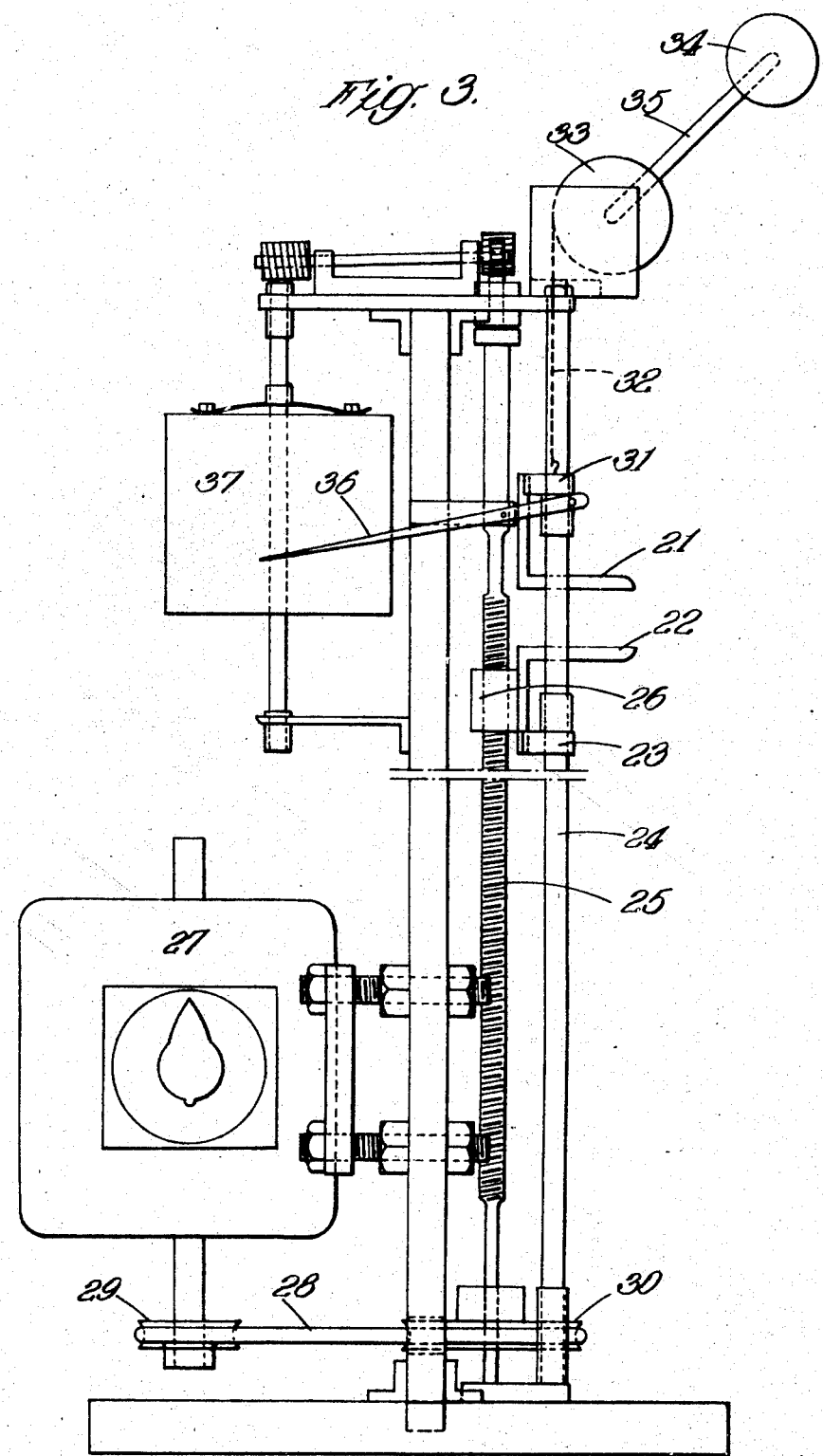

Patented Dec. 23, 1941

2,267,561

UNITED STATES PATENT OFFICE 2,267,561

METHOD OF ESTIMATING THE BAKING QUALITIES OF DOUGHS

Philip Halton, St. Albans, England

Application January 31, 1938, Serial No. 187,808
In Great Britain March 23, 1937

3 Claims. (Cl. 73—51)

The present invention relates to a method of estimating the baking qualities of a wheaten flour dough.

It has been found that a dough of good baking quality should have a high ratio of viscosity to elasticity modulus and that it should also have a low tendency to tear and it is an object of the present invention to provide an improved process for estimating these qualities in a dough. Now the force required to stretch a dough depends both on its viscosity and on its elasticity modulus and a further object of the invention is to provide a method for making up sample doughs from different flours which shall have similar values for elasticity modulus so that their viscosity/elasticity moduli ratios can be determined by measuring the force required to stretch the doughs.

According to the present invention the improved process for determining the quality of a dough comprises making up a dough with a water content such that its elastic modulus is the same as that of a dough having a known and suitable water content.

According to a feature of the present invention the improved process for estimating the baking qualities of doughs comprises making doughs of predetermined and similar elasticity moduli, and testing the doughs for their viscosity/elasticity moduli ratios and tearing properties by measuring the forces required to stretch samples of the doughs and the elongations produced by the force before rupture occurs.

The elasticity modulus of a dough is a function of its water content. A method of estimating the water content necessary to produce doughs of similar moduli may comprise measuring the rate of extrusion of a dough through an aperture under the influence of a standard pressure, since it has been found that doughs of similar times of extrusion have similar values for elasticity modulus.

It has further been found that the water contents which, in different doughs, produce similar elastic moduli bear a constant relation to the most suitable water contents (absorptions) for bread-making. Thus, if the correct water absorption of optimum bread-making be given to a dough and the time of extrusion be determined, and the water contents of other doughs be suitably adjusted to produce the same time of extrusion, then all the doughs will have not only similar elastic moduli but also the most suitable absorptions for bread-making. Hence the same extrusion process can be used also for ascertaining correct bakehouse absorption of flours.

Figure 5:
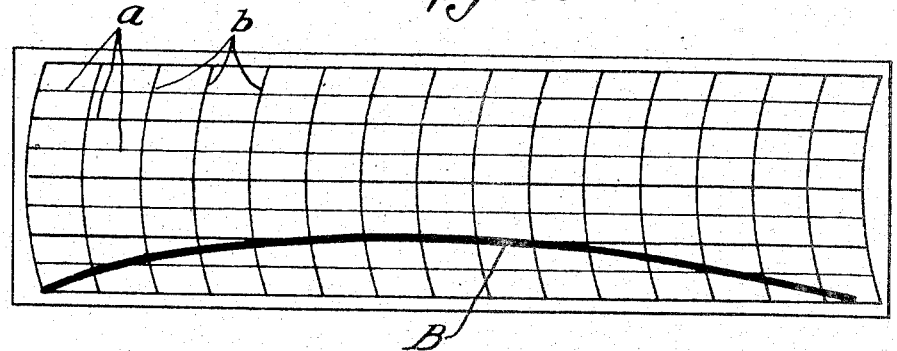
Figure 6:
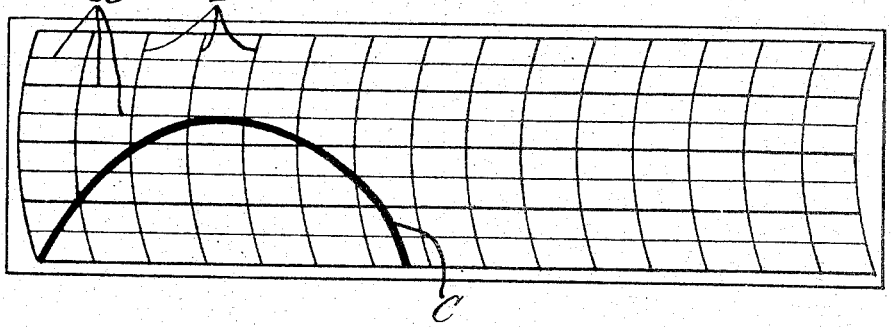

Apparatus suitable for testing dough in accordance with this invention is shown in the accompanying drawings in which:

Figure 1 is a plan view and Figure 2 is a side elevation of apparatus for estimating the elasticity modulus of dough, Figure 3 is a side elevation of apparatus for estimating the viscosity/elasticity moduli ratio and tearing properties of dough, and Figures 4, 5 and 6 show some representative curves obtained on the apparatus shown in Figure 3.

Referring now to Figures 1 and 2 a cylinder 11 is secured to the plate 12 which is mounted on the uprights 13 by means of levelling screws 14 so that the cylinder may be arranged with its axis vertical. The cylinder is closed at its lower end except for a small aperture 15, and within the cylinder is a tightly fitting piston 16 which has a rod 17 secured to its underside, passing through the aperture 15 in the cylinder, and to which is attached a weight 18. A pointer 19 is fastened to the lower end of the rod 17 and co-operates with a fixed vertical scale 20. In order to estimate the required water content of a dough a sample thereof is introduced within the cylinder 11 beneath the piston 16. The force of the weight on the piston 16 causes dough to be extruded through the aperture 15 in the cylinder 11 and the rate of this extrusion, which is a function of the elasticity modulus of the dough, can be measured by the movement of the pointer 19 over the fixed scale 20 in a given time or by the time taken by the pointer 19 to travel a given distance. Hence by measuring the rates of extrusion of doughs made up with different quantities of water the amount of water required to be added to samples of flour to give doughs of predetermined and similar elasticity moduli may be determined.

The viscosity and tearing properties of a dough may be measured by means of the apparatus shown in Figure 3 which comprises two horizontal arms 21 and 22 movable relatively to one another, e. g. in a vertical direction. The lower arm 22 is mounted on a crosshead 23 carried by two vertical guides 24 and can be moved up and down by means of a vertical screw threaded rod 25 engaging with a threaded sleeve 26 fastened to the crosshead 23. The screw threaded rod 25 may be rotated by means of a small electric motor 27 connected with the rod by means of a belt 28 and pulleys 29, 30 or the like. The upper arm 21 is mounted on a crosshead 31 carried by the two vertical guides 24 and is normally supported against a fixed upper stop by a wire 32 passing over and rigidly connected with a pulley wheel 33 to which a weight 34 is attached by a rigid arm 35. If desired a spring or other suitable means may be used to support the upper arm 21 and crosshead 31 against the stop instead of the wire and pulley system shown. The upper arm 21 also engages with one end of a pivoted arm 36, the other end of which carries a pen or like stylus, to record the vertical movement of the arm on a drum 37. This drum 37 is rotated by gearing from the upper end of the threaded rod 25 and the degree of rotation is thus a measure of the distance through which the lower arm 22 has moved. In operation the lower arm 22 is first moved upwards until it is just in contact with the upper arm 21. In this position a ball of dough, made up as previously described so as to have a predetermined elasticity modulus, is impaled symmetrically on the two arms and the motor 27 is then started so as to move the lower arm 22 downwards. The upper arm 21 will tend to be pulled downwards against the action of the weight 34 owing to the viscosity of the dough and the tension exerted on the dough will be recorded on the drum 37. Ultimately the dough will tear apart and the upper arm 21 will spring up and record on the drum the point of rupture. There will thus appear on the drum a record of the force required to stretch the dough and the elongation produced in the dough by this force.

Since the doughs were made to have predetermined and similar elasticity moduli it is thus possible to estimate their viscosity/elasticity moduli ratios and their tendency to tear from which data their baking qualities can be determined readily. For example, a curve such as A in Figure 4, wherein the lines $a$ represent the viscosity/elasticity moduli and $b$ the extensibility, indicates that the dough has both a high viscosity/elasticity modulus ratio and good extensibility. This signifies that the flour is of very good baking quality.

On the other hand, a curve like B, Figure 5, indicates low viscosity/elasticity modulus ratio but good extensibility. The low viscosity/elasticity moduli ratio signifies that the dough is weak and lacking certain desirable features such as spring and stability which are required for bread-making purposes.

Curve C, Figure 6 indicates medium viscosity/elasticity moduli ratio but poor extensibility. While the viscosity/modulus ratio would be high enough for bread-making purposes the poor extensibility shows that the dough tears easily and on this account would be unsatisfactory. It is known to test the elasticity of a dough made up from a sample of flour mixed with a constant percentage of water, by submitting a layer of dough of a predetermined thickness to air pressure until it bursts and calculating the required characteristics from the pressure at which bursting takes place but it is to be observed that in accordance with the present invention, samples of doughs of predetermined and similar elasticity moduli are prepared and the testing operations are purely mechanical and not pneumatic and can be applied even to an aerated dough.

I claim:

1. The method of estimating the baking qualities of doughs, which comprises estimating the water content necessary to produce doughs of similar elastic modulus by measuring the rate of extrusion of the doughs under a predetermined pressure, and then determining the ratio between the viscosity and elastic moduli of said doughs.

2. The method of estimating the baking qualities of doughs, which comprises estimating the water content necessary to produce doughs of similar elastic modulus by measuring the rate of extrusion of the doughs under a predetermined pressure and then stretching the doughs under predetermined tension and at a rate until reaching the breaking point of the doughs to determine the viscosity moduli and extensibility characteristics of the doughs, and thereby ascertaining the ratio between the viscosity and elastic moduli of the doughs.

3. The method of estimating the baking qualities of doughs, which comprises making up samples from different flours with varying quantities of water content so that all samples will have the same elastic modulus, determining the viscosity modulus of each of the samples, and determining the ratios between the viscosity and the elastic moduli of the various samples.

PHILIP HALTON.